(No Model.) 2 Sheets—Sheet 1.
C. A. SHANK.
CAR STARTER AND BRAKE.
No. 411,688. Patented Sept. 24, 1889.
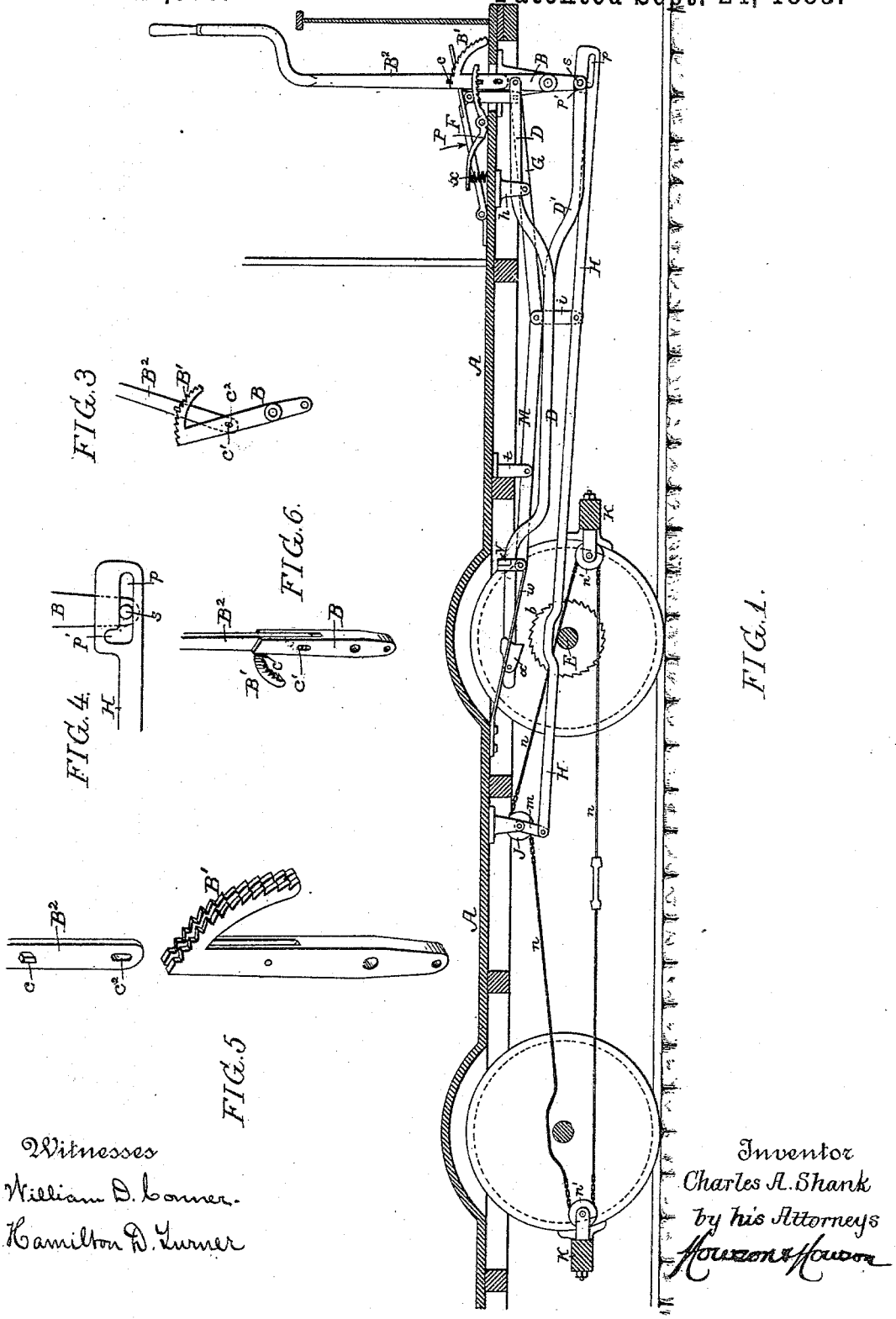
Witnesses
William D. Conner
Hamilton D. Turner
Inventor
Charles A. Shank
by his Attorneys
Howson & Howson

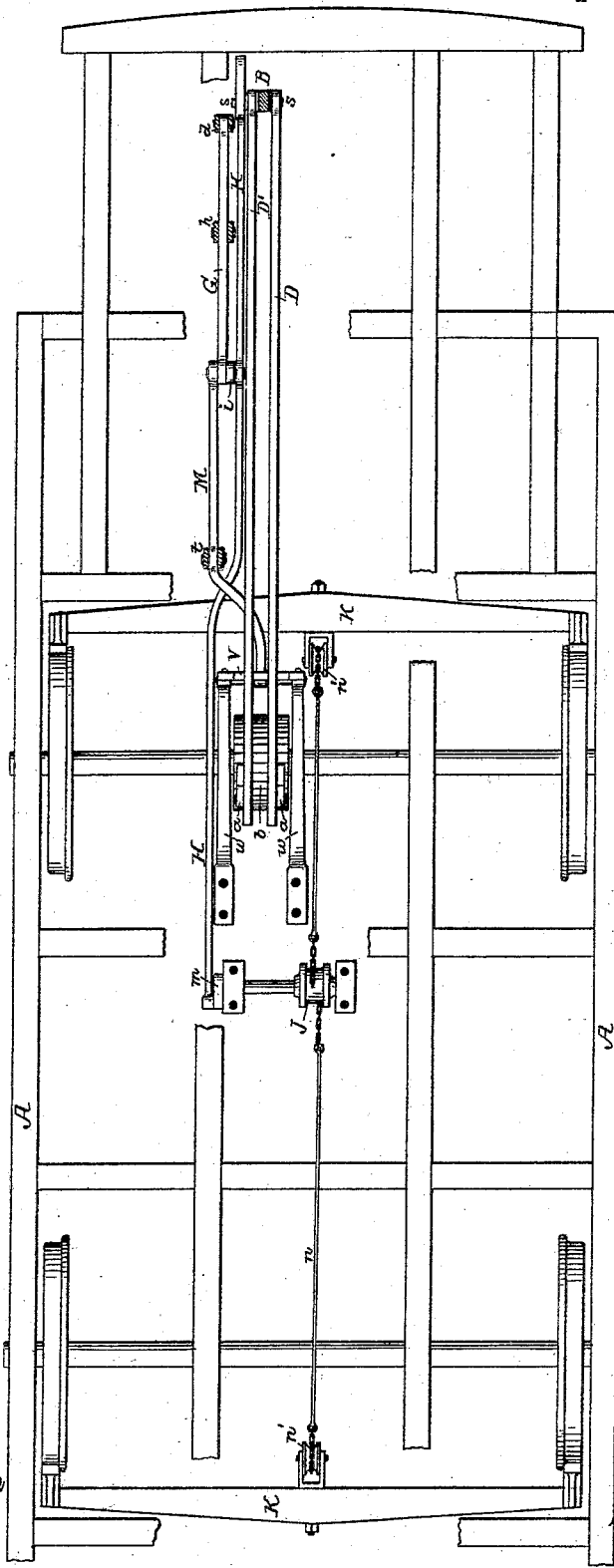

UNITED STATES PATENT OFFICE.

CHARLES A. SHANK, OF PHILADELPHIA, PENNSYLVANIA, ASSIGNOR TO WALTER SMITH AND J. REX ALLEN, BOTH OF SAME PLACE.

CAR STARTER AND BRAKE.

SPECIFICATION forming part of Letters Patent No. 411,688, dated September 24, 1889.

Application filed January 19, 1889. Serial No. 296,842. (No model.)

*To all whom it may concern:*

Be it known that I, CHARLES A. SHANK, a citizen of the United States, and a resident of Philadelphia, Pennsylvania, have invented certain Improvements in Car Starters and Brakes, of which the following is a specification.

My invention consists of certain improvements in a combined car starter and brake, my invention comprising certain details in the construction of the device, as fully described and claimed hereinafter, with the purpose of permitting effective operation of either the starter or brake.

In the accompanying drawings, Figure 1 is a longitudinal section of sufficient of a car to illustrate my combined starter and brake. Fig. 2 is a plan view of the device. Fig. 3 is a side view with some of the parts in a different position. Figs. 4 and 5 are detached views of parts of the device, and Fig. 6 is a view showing a modification.

A represents the floor of the car, to a bracket beneath the front platform of which is pivoted a lever B, to one arm of which is connected a rod D, suitably guided beneath the floor of the car, and having at its rear end a pivoted pawl $a$ for engaging with a ratchet-wheel $b$ on the front axle E of the car, the other arm of the lever B having a similar rod D', provided with a pawl $a'$, also engaging with the ratchet-wheel $b$ on the axle E, so that by vibrating the lever B a constant continuous forward movement may be imparted to said axle, and the forward movement of the car thus effected or assisted by the driver.

The upper arm of the lever B is forked, as shown in Fig. 5, and terminates at the upper end in a notched quadrant B', with which engage lugs $c$, formed on an operating-arm B$^2$, the latter being hung to a pin $c'$, carried by the forked arm of the lever B, and said arm B$^2$ having a slot $c^2$ for the reception of the pivot-pin, so that the arm can be raised or lowered in respect to the lever to move the lugs $c$ into or out of engagement with the notched quadrant of the lever.

Pivoted to the front platform of the car is a treadle F, which is connected by means of a link $d$ to one arm of a lever G, hung to a bracket $h$ beneath said platform, the other arm of said lever being connected by a link $i$ to a rod H, the rear end of which is connected to an arm $m$ on the shaft of the brake-drum J, hung to a suitable bearing beneath the floor of the car, and receiving the opposite ends of a brake rope or chain $n$, which passes around pulleys $n'$, carried by suitable bearings on the brake-beams K. The front end of the rod H has formed in it a slot $p$, with offset $p'$, and to this slot is adapted a pin $s$ near the end of the lower or short arm of the lever B. The rear end of the lever G is connected to the front end of a lever M, hung to the bracket $t$ beneath the floor of the car, the rear end of this lever having a cross-bar V, which engages with the rear ends of the rods D D', springs $w$ acting upon the cross-bar in such manner as to lift the same, and with it the rear ends of the rods D D', so as to hold the pawls $a$ $a'$ normally out of gear with the ratchet-wheel $b$. This movement is also transmitted to the lever M, and thence to the lever G, and has the effect of elevating the treadle F and depressing the rod H, so that the pin $s$ of the lever B occupies a position in the vertical offset $p'$ of the slot $p$ in said arm, as shown in Fig. 1. It will thus be seen that under ordinary circumstances the brake-operating rod H is connected to the lever B, while the ratchet-wheel on the axle E is free from control of the same, so that the brake can be applied by a simple pull upon the lever. When, however, it is desired to use the lever for the purpose of starting or assisting in starting the car, the treadle F is depressed, the result of this action being that the rod H is lifted until the pin $s$ of the lever occupies the horizontal portion $p$ of the slot in the rod and permits the movement of said lever without any effect upon the rod. (See Fig. 4.) By the depression of the treadle F the lever M is also so operated as to permit the rear ends of the arms D D' to fall and bring their pawls into engagement with the ratchet-wheel on the axle, so that forward movement can be imparted to said axle by vibrating the lever B, the pawls acting alternately.

If a single movement of the arm B$^2$ of the lever B is not sufficient to start the car or apply the brake, the arm may after the first movement be lifted and moved forward, so that its lugs take hold on the quadrant B' at a point further in advance, as shown in Fig. 3, when a farther movement may be imparted to the lever, the slipping of the latter being prevented by a notched lever P, one arm of which has a treadle for depression by the driver of the car when it is desired to release the lever, a spring $x$ keeping the lever normally in active position.

The quadrant B' may, if desired, be formed upon the arm B² instead of upon the lever B, as shown, for instance, in Fig. 6, the lever having a lug $c$ for engaging with the quadrant, and the arm B² may also, if desired, carry the pivot-pin $c'$, the slots $c^2$ being formed in the lever, as also shown in said figure.

In some cases the rod H may be connected to the ordinary brake mechanism of the car, the rod taking the place of the usual chain leading to the brake-shaft; but the construction shown in the drawings is preferred.

Having thus described my invention, I claim and desire to secure by Letter Patent—

1. The combination of the axle having a ratchet-wheel, the platform-lever having rods carrying pawls for engaging with said ratchet-wheel, and a brake-operating rod also connected to said lever, but independent of the pawl-rods, substantially as specified.

2. The combination of the axle having a ratchet-wheel, the platform-lever, the rods connected thereto and having pawls engaging with said ratchet-wheel, a brake-rod movable into or out of operative connection with the platform-lever, a treadle on the platform, and means for connecting said treadle to the pawl-rods and brake-rod, whereby one may be thrown into action when the other is thrown out of action, substantially as specified.

3. The combination of the platform-lever with the brake-rod having a horizontal slot with vertical offset for the reception of a pin on the lever, substantially as specified.

4. The combination of the platform-lever having an operating-arm loosely pivoted thereto, a notched quadrant on one of said parts, and an engaging stud or projection on the other part, substantially as specified.

5. The combination of the platform-lever having an operating-arm loosely pivoted thereto, a notched quadrant on one of said parts, a stud on the other part for engaging with said quadrant, and a retainer for holding the lever after it has been moved, all substantially as specified.

6. The combination of the platform-lever having a forked arm terminating in a notched quadrant, and an operating-arm for said lever having a slot-and-pin pivot-connection therewith, and a stud for engaging said notched quadrant, all substantially as specified.

In testimony whereof I have signed my name to this specification in the presence of two subscribing witnesses.

CHARLES A. SHANK.

Witnesses:
WILLIAM D. CONNER,
HARRY SMITH.